United States Patent
Berger et al.

(10) Patent No.: US 9,540,055 B2
(45) Date of Patent: Jan. 10, 2017

(54) UNDERBODY UNIT FOR A MOTOR VEHICLE

(71) Applicant: Dr. Ing. h.c. F. Porsche Aktiengesellschaft, Stuttgart (DE)

(72) Inventors: Dennis Berger, Bietigheim-Bissingen (DE); Reyk Bienert, Eberdingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 14/805,501

(22) Filed: Jul. 22, 2015

(65) Prior Publication Data

US 2016/0023688 A1    Jan. 28, 2016

(30) Foreign Application Priority Data

Jul. 22, 2014   (DE) .................. 10 2014 110 304

(51) Int. Cl.
*B60L 11/18* (2006.01)
*B60K 1/04* (2006.01)
(Continued)

(52) U.S. Cl.
CPC ............ *B62D 35/007* (2013.01); *B60K 1/04* (2013.01); *B60K 11/02* (2013.01); *B60L 11/1874* (2013.01);
(Continued)

(58) Field of Classification Search
CPC combination set(s) only.
See application file for complete search history.

(56) References Cited

U.S. PATENT DOCUMENTS 4,365,681 A * 12/1982 Singh ................. B60K 1/04
    105/51
5,390,754 A *  2/1995 Masuyama ......... B60K 1/04
    105/51
(Continued)

FOREIGN PATENT DOCUMENTS

DE          4412450    10/1995
DE    102012009322    11/2012
(Continued)

OTHER PUBLICATIONS

Korean Office Action Dated Aug. 4, 2016.

*Primary Examiner* — Frank Vanaman
(74) *Attorney, Agent, or Firm* — Gerald E. Hespos; Michael J. Porco; Matthew T. Hespos

(57) ABSTRACT

An underbody unit for a motor vehicle body has a floor body (12) connectable to the motor vehicle body for dissipating static and/or dynamic loads. Reinforcing ribs (14) protrude up from the floor body (12). The reinforcing ribs (14) together with the floor body (12) delimit receiving pockets (16) for receiving battery cell units (18) of a traction battery for driving the motor vehicle. First and second connections (34, 36) supply and remove a liquid cooling medium for cooling the floor body (12). The battery cell units (18) are above the floor body (12) and can be inserted into the underbody unit (10). Thus, the underbody unit (10), the reinforcing ribs (14) and the connections (34, 36) for the coolant define a supporting plate that can support the heavy battery cell units (18), form armor plating for protection and a heat exchanger for active and/or passive cooling.

9 Claims, 2 Drawing Sheets

(51) Int. Cl.
*B62D 35/00* (2006.01)
*B62D 25/20* (2006.01)
*B60K 11/02* (2006.01)
*B60K 1/00* (2006.01)

(52) U.S. Cl.
CPC ............ *B60L 11/1877* (2013.01); *B62D 25/20* (2013.01); *B60K 2001/005* (2013.01); *B60K 2001/0438* (2013.01)

(56) References Cited

U.S. PATENT DOCUMENTS

| | | | |
|---|---|---|---|
| 5,641,031 A | 6/1997 | Riemer et al. | |
| 5,678,760 A * | 10/1997 | Muso | B60K 11/02 165/41 |
| 5,833,023 A | 11/1998 | Shimizu | |
| 6,330,925 B1 * | 12/2001 | Ovshinsky | B60K 6/24 180/65.245 |
| 7,147,071 B2 * | 12/2006 | Gering | B60H 1/00278 165/164 |
| 7,824,797 B2 | 11/2010 | Nishino et al. | |
| 8,409,749 B2 | 4/2013 | Nishino et al. | |
| 2006/0132101 A1 * | 6/2006 | Ambrosio | B60L 11/1855 320/150 |
| 2006/0169507 A1 * | 8/2006 | Inoue | B60K 11/02 180/68.4 |
| 2008/0173489 A1 * | 7/2008 | Takasaki | B60K 1/04 180/68.5 |
| 2009/0142653 A1 | 6/2009 | Okada | |
| 2009/0186266 A1 | 7/2009 | Nishino et al. | |
| 2009/0253028 A1 * | 10/2009 | Takagi | B60L 11/1874 429/62 |
| 2009/0317697 A1 * | 12/2009 | Dogariu | B60H 1/00278 429/62 |
| 2010/0190044 A1 | 7/2010 | Nishino et al. | |
| 2012/0018238 A1 | 1/2012 | Mizoguchi et al. | |
| 2012/0055725 A1 | 3/2012 | Mizoguchi | |
| 2012/0263984 A1 | 10/2012 | Krammer | |
| 2012/0286541 A1 | 11/2012 | Kashiwagi | |
| 2014/0246259 A1 | 9/2014 | Yamamura et al. | |

FOREIGN PATENT DOCUMENTS

| | | |
|---|---|---|
| JP | 2009087737 | 4/2009 |
| WO | 2010136861 | 12/2010 |
| WO | 2013/051638 | 4/2013 |

* cited by examiner

UNDERBODY UNIT FOR A MOTOR VEHICLE

CROSS REFERENCE TO RELATED APPLICATION

This application claims priority under 35 USC 119 to German Patent Appl. No. 10 2014 110 304.1 filed on Jul. 22, 2014, the entire disclosure of which is incorporated herein by reference.

BACKGROUND

1. Field of the Invention

The invention relates to an underbody unit for reinforcing a body of a motor vehicle.

2. Description of the Related Art

A motor vehicle body can have a load-bearing supporting structure with longitudinal members of solid design and crossmembers of solid design connected to one another to form a supporting frame. The supporting frame forms a stable platform to which the remaining components of the motor vehicle can be connected. The supporting structure can support a drive, individual body parts, functional units of the motor vehicle and a payload and can dissipate the weight of these components onto an underlying surface. A plate-like underbody unit can be connected to the supporting structure to reinforce the supporting structure and the motor vehicle body. The underbody unit forms the underbody of the motor vehicle and covers and protects constructional units above the underbody unit from the underlying surface.

WO 2013/051638 A1 discloses connecting a battery housing of a traction battery from below to an underbody of a motor vehicle. A lower side of the battery housing faces the underlying surface and is configured as a thin-walled cast aluminum part with outwardly protruding cooling ribs.

There is a constant need for a motor vehicle traction battery to have a long service life. Accordingly, an object of the invention is to present measures that will increase the service life for a motor vehicle traction battery to have a long service life.

SUMMARY OF THE INVENTION

The invention relates to an underbody unit for reinforcing a motor vehicle body between a front axle and a rear axle of the motor vehicle. The underbody unit includes a floor body that is connectable to the motor vehicle body for dissipating static and/or dynamic loads of the motor vehicle body. Reinforcing ribs protrude substantially vertically up from the floor body. The reinforcing ribs together with the floor body delimit receiving pockets for receiving at least one battery cell unit of a traction battery for driving the motor vehicle in hybrid form and/or purely electrically. The underbody unit further has a first connection for the supply of a liquid cooling medium for cooling the floor body, and a second connection for removal of the liquid cooling medium.

The reinforcing ribs enable the underbody unit to be sufficiently stable and stiff for static and dynamic loads that occur during operation of the motor vehicle to be absorbed and dissipated for reinforcing a supporting structure of the motor vehicle body with little use of material. The floor body can be configured, for example, in the manner of a trough with reinforcing ribs projecting inward into the volume of the trough. Each reinforcing rib can run in the longitudinal direction and transverse direction of the motor vehicle and can intersect one another in the process. As a result, substantially rectangular receiving pockets can be formed. At least some of the reinforcing ribs may be connected to laterally outer side walls of the floor body. The side walls can laterally delimit the volume spanned by the trough. The battery cell units can be inserted at least partially from above into the receiving pockets.

The reinforcing ribs of the floor body reinforce the underfloor unit and the motor vehicle body, and also receive and cool the battery cell units. Thus, the reinforcing ribs carry out plural functions simultaneously. The underfloor element and the reinforcing ribs cooperate so that the underbody unit forms a supporting base for a battery housing of a traction battery. Additionally, the reinforcing conduct away heat generated in the battery cell units to the floor body, and the floor body can be cooled by the cooling medium supplied and removed via the connections. Therefore, the battery cell units will not be overheated and damaged by heat that is not removed. As a result, the floor body is used as a reinforcement for both the underbody unit and the motor vehicle body, and also as a heat exchanger for cooling the battery cell units. The solidly designed floor body can dissipate loads anticipated while operating the motor vehicle or in the event of a crash and also functions as armor plating for the battery cell units. Therefore the battery cell units are protected against damage from an obstacle protruding up from the underlying surface. The floor body is configured to be sufficiently stable to dissipate the deadweight of the liquid cooling medium without risk of buckling. Accordingly, a high mass of cooling medium can be introduced into the floor body so that the cooling capacity of the cooling medium can be increased without adversely affecting the structural integrity of the underbody unit. As a result, the floor body also carries out plural functions simultaneously. Positioning the battery cell units above the underbody unit in a lower region of the motor vehicle enables the underbody unit to be used: as part of an armor-plated battery housing; as a solid supporting base; and as a heat exchanger. Thus, the battery cell units of the traction battery can be inserted above the floor body into the underbody unit. The reinforcing ribs and the connections for the coolant enable the underbody unit to function as a heat exchanger that can actively and/or passively cool the battery cell units, as well as functioning as a supporting plate of a battery housing that can support the heavy battery cell units, and as armor plating can protect the battery cell units. Therefore, a motor vehicle traction battery provided in a lower region of the motor vehicle can have a long service life.

The floor body can extend in the transverse direction of the motor vehicle between maximally far right and maximally far left longitudinal members of a supporting structure of the motor vehicle body. At a distance D of the center lines of the right and left longitudinal members, $1.10 \leq d/D \leq 0.80$, preferably $1.00 \leq d/D \leq 0.90$ and particularly preferably $0.98 \leq d/D \leq 0.95$ applies to the extent d of the floor body in the transverse direction. All of the battery cell units may be arranged between the left and right longitudinal members. The left and right longitudinal members may cover at least part of the battery cell units, as viewed in the transverse direction. Therefore the right and left longitudinal members can serve as armor plating for the battery cell units in the event of a side crash of the motor vehicle. The floor body can extend in the longitudinal direction between the front axle and the rear axle of the motor vehicle. Given a wheel base A between the front and rear axles, $1.10 \leq a/A \leq 0.30$, preferably $1.00 \leq a/A \leq 0.40$, furthermore preferably $0.90 \leq a/A \leq 0.50$ and particularly preferably $0.80 \leq a/A \leq 0.60$ applies for the extent a of the floor body in the longitudinal direction. The floor body and/or the reinforcing ribs may be produced from aluminum, preferably an aluminum casting. The floor body is connected to a frame-shaped housing part and/or a housing cover to encapsulate the traction battery and to protect the battery cell units against external influences. The floor body may be connected with the aid of suitable sealing means, with sufficient tightness to the frame-shaped housing part and/or the housing cover so that substantially no liquid cooling medium can escape during operation. For this purpose, the floor body has a large wall thickness, for example, in the region of the contact points of the sealing means with the frame-shaped housing part and/or with the housing cover. An upwardly facing end of the floor body in the region of the outer walls may have a flange that is closed circumferentially to form a sufficiently large wall thickness for adequate sealing to retain the liquid cooling medium.

The cooling medium can be conducted through the underbody unit via the first and second connections to cool or heat the battery cell units directly or indirectly. The cooling medium used may be cooling water or cooling oil. Liquid-tight sealing is sufficient, and therefore gas-tight sealing is not required. The first and second connections can be connected to hose lines of a cooling system and/or of a refrigerating system separate from the cooling system. A cold cooling medium can be introduced into the underfloor unit via the first connection, is heated in the underfloor unit and can leave the underbody unit via the second connection. The second connection can be connected outside the underbody unit to the first connection via a cooler and a pump, thereby forming a cooling circuit. It is also possible for the second connection to be connected to a heat exchanger of a chiller to withdraw heat from the cooling medium. The cooled cooling medium can be supplied to the underbody unit via a further first connection and can pass via a further second connection to a pump that pumps the cooling medium into the underbody unit via the first connection. In particular with the aid of a condenser and an expansion valve, the chiller can supply a refrigerating agent of an appropriately low temperature to the heat exchanger where the refrigerating agent can be evaporated from the cooling medium coming from the underbody unit to withdraw heat from the cooling medium. The refrigerating agent can be conveyed in the circuit with the aid of a compressor.

A cooling channel may be formed in the floor body and may extend between the first and second connections for removing heat from the battery cell units and for outputting that heat to the floor body and/or to the reinforcing ribs. The cooling channel can define a predetermined course of the cooling medium through the underbody unit. Forming the cooling channel in the floor body itself avoids the need for separate cooling hoses.

The cooling channel may be formed completely within the floor body. The at least one cooling channel can be configured, for example, as a bore through the solid material of the floor body. As a result, the cooling channel can be formed automatically in a liquid-tight manner for the liquid cooling medium. For example, cooling channels can run in the longitudinal direction and in the transverse direction and can intersect. End openings in the cooling channels that are not required for the connections can be closed in a liquid-tight manner. Running the cooling channel completely within the floor body avoids direct contact of the cooling medium with the energy cell units in the receiving pockets, and therefore an electric short circuit cannot occur via the cooling medium.

The floor body may be connected to a cooling system having a low-temperature cooler for cooling the liquid cooling medium, and to a refrigerating system having a heat exchanger, such as a chiller, for cooling the liquid cooling medium. The cooling power provided by the cooling system and the refrigerating system can be switched on or off independently of each other. Thus, it is possible to cool the liquid cooling medium only in the cooling system with the aid of the low-temperature cooler, or only in the refrigerating system with the aid of the heat exchanger. The maximum cooling capacity of the cooling system may be lower than the maximum cooling capacity of the refrigerating system. As a result, slightly different cooling capacities can be provided for cooling the liquid cooling medium, thereby enabling efficient reactions to different requirements of the battery cell units with regard to the currently required cooling capacity. For example, different cooling capacity requirements of the battery cell units during charging and discharging can be taken into consideration with high efficiency. The cooling system may be connected to the floor body by using the first and/or the second connections and optionally further comparably configured connections of the floor body. The cooling capacity provided by the cooling system or by the refrigerating system can be switched on and off with the aid of suitable valves. The refrigerating system may have a refrigerating agent that is different from the cooling medium and that is in a cooling circuit separate from the cooling medium for providing a greater cooling capacity than the cooling system with the low-temperature cooler.

The floor body may have a left fastening flange for fastening to a left longitudinal member of a supporting structure of the motor vehicle body and a right fastening flange for fastening to a right longitudinal member of the supporting structure. As a result, the underbody unit can be connected directly to the supporting structure of the motor vehicle body and, via the material of the floor body, can dissipate static and/or dynamic loads that occur. A frame-shaped intermediate housing and/or a housing cover of a battery housing can be connected to the floor body in a vertical extension of outer side walls of the floor body. Additionally or alternatively, parts of the battery housing can be connected to the respective fastening flange. As a result, fastening means need not be provided in the side walls, and therefore, an upper side of the side walls can be used to form liquid-tight sealing of the battery housing. Furthermore, the horizontally protruding fastening flange can act as a cooling rib in order to remove heat of the battery cell units. This heat can be absorbed by the floor body, convectively and/or by heat conduction to the longitudinal members.

The reinforcing ribs may be formed integrally with the floor body, thereby ensuring good heat conduction between the reinforcing ribs and the floor body without thermal resistances at phase limits with respect to separate components connected in between. Furthermore, the production and the installation can be simplified.

The floor body may have a lower side that is exposed to a slipstream. Heat of the battery cell units that is absorbed by the floor body can be removed via the lower side. The slipstream can bring about a particularly good heat transition and can achieve a correspondingly high cooling capacity.

A heating element for heating the floor body and/or the reinforcing ribs may be provided, and may be embedded in a corresponding depression of the floor body. The heating element can heat the material of the floor body, which, in turn, can heat the battery cell units. As a result, the underbody unit can cool and heat the battery cell units. Heating may control the temperature of the battery cell units to a suitable operating temperature when outside temperatures are low. Thus, it is possible to regulate the temperature of the battery cell units to a target temperature for achieving high efficient and a long service life.

The invention further relates to a traction battery for driving a motor vehicle in hybrid form and/or purely electrically. The traction battery has battery cell units inserted in a battery housing. The battery housing has a support plate that supports the battery cell units and that is coupled thermally to the battery cell units. The support plate may be the above-described underbody unit for reinforcing a motor vehicle body of a motor vehicle. The battery cell units of the traction battery can be inserted above the solidly designed floor body into the underbody unit. As a result, the underbody unit functions as a supporting plate of the battery housing and can support the heavy battery cell units with the aid of the reinforcing ribs and the connections for the coolant. The underbody unit also functions as armor plating for protecting the battery cell units and as a heat exchanger for actively and/or passively cooling the battery cell units. Therefore it is possible for a motor vehicle traction battery in a lower region of the motor vehicle to have a long service life.

The invention further relates to a motor vehicle comprising a motor vehicle body with a load-bearing supporting structure and a traction battery that is connected to the supporting structure on a lower side of the motor vehicle body. The supporting structure can be designed and developed as described above for reinforcing the motor vehicle body.

The invention is explained by way of example below using preferred exemplary embodiments with reference to the attached drawings, wherein the features illustrated below, in each case individually and also in combination, can constitute one aspect of the invention.

DETAILED DESCRIPTION

Figure 1:
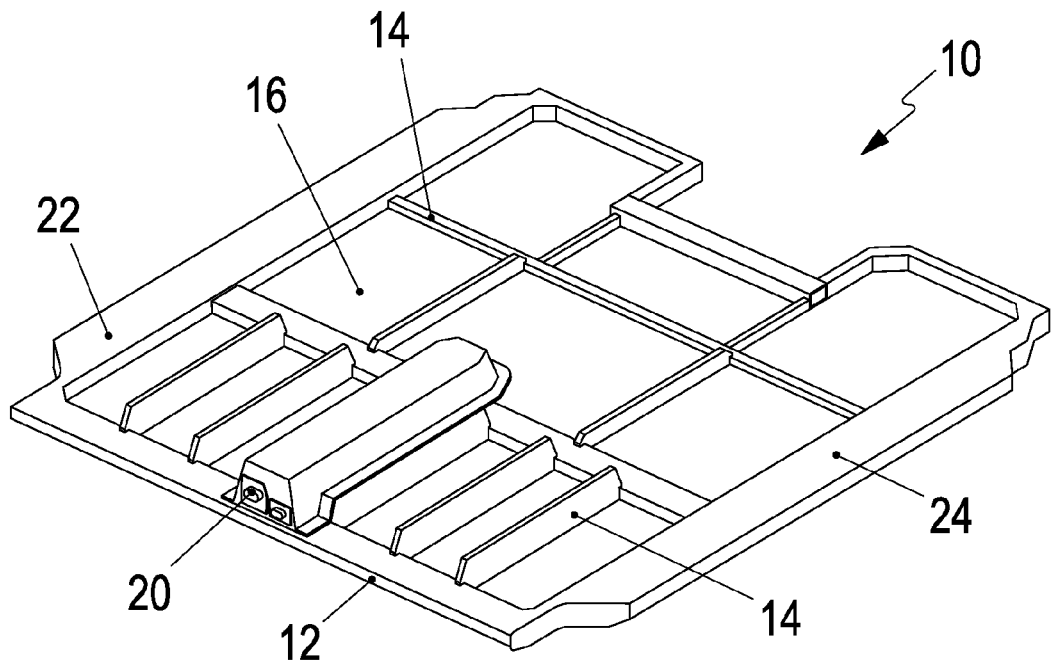
FIG. 1 is a schematic perspective view of an underbody unit.
Figure 2:
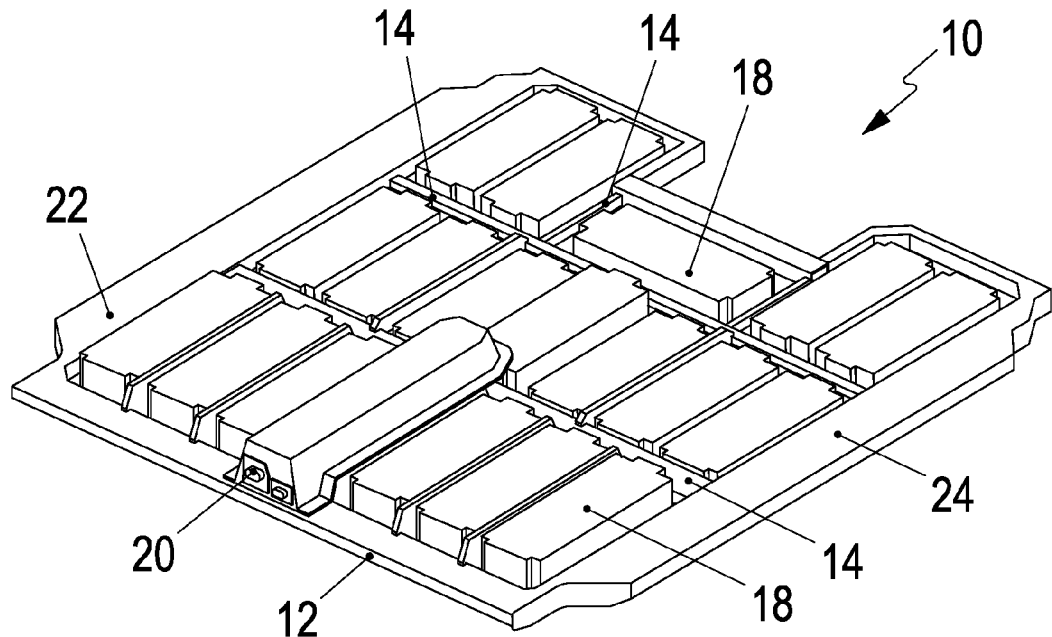
FIG. 2 is a schematic perspective view of the underbody unit of FIG. 1 with battery cell units inserted.

An underbody unit 10 is illustrated in FIG. 1 and is configured to reinforce a motor vehicle. The underbody unit 10 has a floor body 12 that is of solid configuration. Reinforcing ribs 14 protrude integrally up from the floor body 12 and run in the longitudinal and transverse directions. Receiving pockets 16 are formed between the intersecting reinforcing ribs 14 and outer side walls of the floor body 12. Battery cell units 18 can be inserted into the receiving pockets 16 from above to form a traction battery, as shown in FIG. 2. The battery cell units 18 are connected electrically to one another and can output stored electrical energy via an electric connection 20 and/or can absorb and store electrical energy produced mechanically by a drive train of the motor vehicle. Left and right fastening flanges 22 and 24 protrude laterally from the floor body 12 and enable the underbody 10 to be fastened to left and right longitudinal members of a supporting structure of a motor vehicle body of the motor vehicle.

Figure 3:
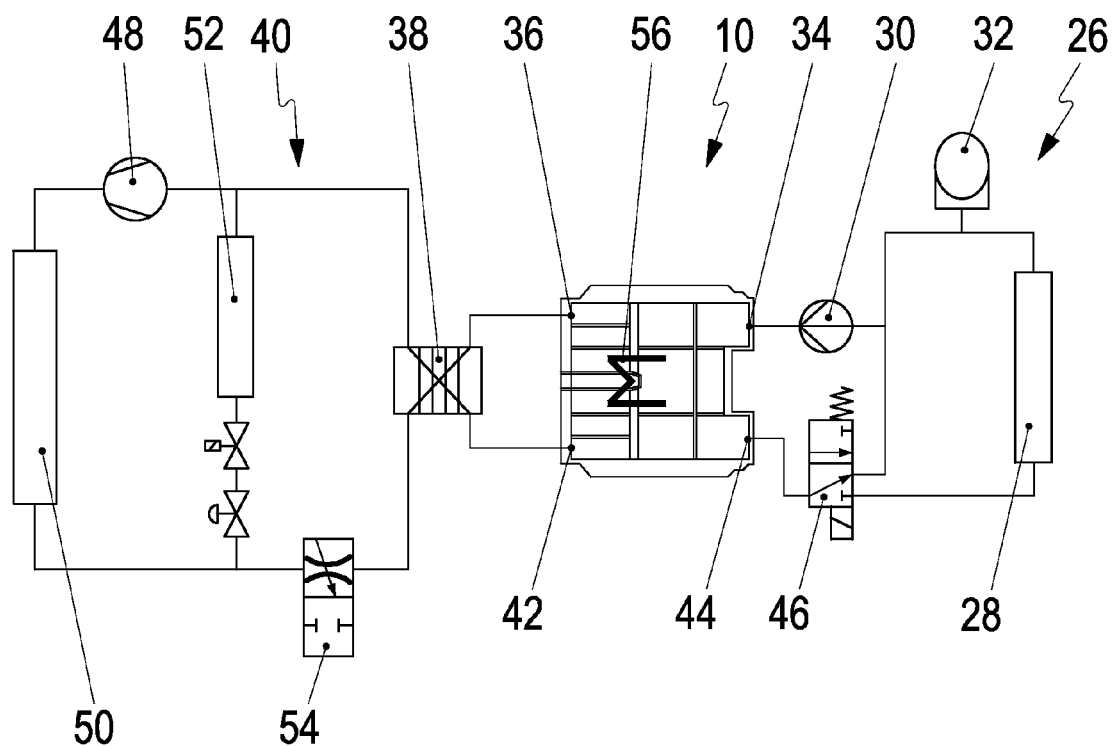
FIG. 3 is a schematic illustration of an embodiment of a cooling system for the underbody unit of FIG. 1.

As illustrated in FIG. 3, the underbody unit 10 can be cooled by a cooling system 26. For this purpose, a liquid cooling medium may be cooled by a low-temperature cooler 28, such as an air-cooled, front-end motor vehicle cooler. The cooling medium can be conducted by a pump 30 out of an equalizing tank 32 via a first connection 34 into a cooling channel formed in the floor body 12. The heat output by the battery cell units 18 can be output to the cooling medium via the reinforcing ribs 14 and the floor body 12. The heated cooling medium can leave the underbody unit 10 in the liquid state via a second connection 36 and can be recycled to the low-temperature cooler 28. In the illustrated embodiment, the cooling medium initially is supplied to a heat exchanger 38 of a refrigerating plant 40 where the cooling medium is cooled. The cooled cooling medium can be supplied in the liquid state to the underbody unit 10 via a further first connection 42 and, via a further second connection 44, can leave the underbody unit 10 in the liquid state and can be returned via a 3/2-way directional control valve 46. In the illustrated first switching position of the 3/2-way directional control valve 46, the refrigerating medium is supplied directly to the pump 30 past the low-temperature cooler 28 and the equalizing tank 32, and therefore the refrigerating medium is cooled only in the heat exchanger 38. In the second switching position of the 3/2-way directional control valve 46, the cooling medium is conducted via the low-temperature cooler 28, and therefore the cooling medium can additionally or alternatively be cooled in the low-temperature cooler 28.

The refrigerating plant 40 has a refrigerating agent that can be supplied in the gaseous state by a compressor 48 to a condenser where the refrigerating agent condenses. The liquid refrigerating agent can be recycled via an evaporator 52 and/or can be supplied via a switchable expansion valve 54 to the heat exchanger 38 from which the heated refrigerating agent can be supplied to the compressor 48. A flow of the refrigerating agent to the heat exchanger can be interrupted with the aid of the switchable expansion valve 54, and therefore cooling of the refrigerating medium in the heat exchanger 38 can be switched off, and the refrigerating medium is cooled only in the low-temperature cooler 28. A heating element 56 can be integrated in the floor body 12 for heating or preheating the battery cell units 18.

The cooling system 26 has two different operating modes with different cooling for the liquid cooling medium. In a first operating mode, the liquid cooling medium can be conducted past the low-temperature cooler 28 with the aid of the 3/2-way directional control valve 46, and therefore essentially only the pump 30 is used. The further second connection 44 is bypassed by the first connection 34 with the intermediate connection of the pump 30. The cooling medium is thereby cooled only in the heat exchanger 38, which is configured as a chiller. For this purpose, the switchable expansion valve 54 is in a switching position in which the cooling medium of the refrigerating circuit 40 can enter the heat exchanger 38 in order to cool the liquid cooling medium. In a second operating mode, the switchable expansion valve 54 can be in a switching position in which an inflow of the coolant of the refrigerating circuit 40 into the heat exchanger 38 is interrupted. The second connection 36 is bypassed by the further first connection 42 without the liquid coolant being cooled in the heat exchanger 38. At the same time, the 3/2-way directional control valve 46 is switched into a switching position in which the liquid cooling medium is conducted to the low-temperature cooler 28. In the first operating mode, the cooling of the cooling medium is determined by the cooling in the heat exchanger 38 of the refrigerating circuit while, in the second operating mode, the liquid cooling medium is conducted to the low-temperature cooler 28. In the first operating mode, the cooling of the cooling medium is determined by the cooling in the low-temperature cooler 28. As a result, suitable cooling can be produced depending on the situation and cooling capacity requirement of the battery cell units 18. For example, it is possible effectively and highly efficiently to react to a different cooling capacity requirement of the battery cell units 18 during charging and during discharging. In principle, an operating mode is also possible in which the 3/2-way directional control valve 46 and the switchable expansion valve 54 are switched in such a manner that the cooling medium is cooled neither in the low-temperature cooler 28 nor in the heat exchanger 38 and, should the need arise, cooling takes place by natural convection at the underfloor unit 10. An operating mode is likewise basically possible in which the 3/2-way directional control valve 46 and the switchable expansion valve 54 are switched in such a manner that the cooling medium is cooled both in the low-temperature cooler 28 and in the heat exchanger 38.

What is claimed is:

1. An underbody unit for reinforcing a motor vehicle body of a motor vehicle between a front axle and a rear axle, comprising:
    a floor body that is connectable to the motor vehicle body, for dissipating static and/or dynamic loads of the motor vehicle body;
    reinforcing ribs protruding up from the floor body and defining receiving pockets for receiving at least one battery cell unit of a traction battery for driving the motor vehicle as a hybrid vehicle and/or as a purely electric vehicle;
    first and second inlets for accommodating in-flows of a liquid cooling medium into the floor body;
    first and second outlets for accommodating outflows of the liquid cooling medium from the floor body;
    a low temperature cooler for cooling the liquid cooling medium;
    a first valve selectively switchable between a first position where the first valve causes the liquid cooling medium to flow directly from the first outlet to the first inlet and a second position where the first valve causes the liquid cooling medium to flow from the first outlet to the first inlet via the low temperature cooler;
    a heat exchanger accommodating a flow of the liquid cooling medium from the second outlet to the second inlet; and
    a refrigerating circuit including a second valve for selectively permitting or interrupting a flow of a coolant through the heat exchanger, whereby the first and second valves are operated for selectively causing the liquid cooling medium to be cooled by both the low temperature cooler and the heat exchanger, or by a selected one of the low temperature cooler and the heat exchanger or by neither the low temperature cooler or the heat exchanger in accordance with cooling needs of the traction battery.

2. The underbody unit of claim 1, wherein the first and second inlets and the first and second outlets communicate with a cooling channel in the floor body and/or the reinforcing ribs for removing heat from the battery cell units and outputting the heat to the floor body and to the reinforcing ribs.

3. The underbody unit of claim 2, wherein the cooling channel is formed completely within the floor body.

4. The underbody unit of claim 1, wherein the floor body has left and right fastening flanges for fastening respectively to left and right longitudinal members of a supporting structure of the motor vehicle body.

5. The underbody unit of claim 1, wherein the reinforcing ribs are formed integrally with the floor body.

6. The underbody unit of claim 1, wherein the floor body has a lower side exposed to a slipstream.

7. The underbody unit of claim 1, further comprising a heating element embedded in a depression of the floor body for heating the floor body and/or the reinforcing ribs.

8. A traction battery for driving a hybrid vehicle or a purely electric vehicle, comprising: the underbody unit of claim 1 configured to form a battery housing; and a plurality of battery cell units inserted in the battery housing of the underbody unit.

9. A motor vehicle comprising a motor vehicle body having a load-bearing supporting structure on a lower side of the motor vehicle body and the traction battery of claim 8 connected to the supporting structure.

\* \* \* \* \*